(12) United States Patent
Hu et al.

(10) Patent No.: US 12,388,260 B2
(45) Date of Patent: Aug. 12, 2025

(54) COORDINATED CONTROL METHOD AND SYSTEM FOR ACTIVE SUPPORT OF NEW ENERGY POWER STATION CONTAINING VOLTAGE-CONTROLLED SOURCE

(71) Applicant: State Grid Hubei Electric Power Research Institute, Hubei (CN)

(72) Inventors: Pan Hu, Hubei (CN); Kezheng Jiang, Hubei (CN); Xiaotong Ji, Hubei (CN); Kan Cao, Hubei (CN); Dan Liu, Hubei (CN); Chang Ye, Hubei (CN); Fan Xiao, Hubei (CN); Wanting Deng, Hubei (CN); Yiqun Kang, Hubei (CN); Ping Xiong, Hubei (CN); Daojun Tan, Hubei (CN); Wei Wang, Hubei (CN); Xiaoming Chen, Hubei (CN)

(73) Assignee: State Grid Hubei Electric Power Research Institute, Wuhan (CN)

( * ) Notice: Subject to any disclaimer, the term of this patent is extended or adjusted under 35 U.S.C. 154(b) by 0 days.

(21) Appl. No.: 17/924,445

(22) PCT Filed: Sep. 9, 2022

(86) PCT No.: PCT/CN2022/118039
§ 371 (c)(1),
(2) Date: Nov. 10, 2022

(87) PCT Pub. No.: WO2023/151269
PCT Pub. Date: Aug. 17, 2023

(65) Prior Publication Data
US 2024/0222974 A1    Jul. 4, 2024

(30) Foreign Application Priority Data

Feb. 10, 2022    (CN) .......................... 202210123282.9

(51) Int. Cl.
*H02J 3/16* (2006.01)
*H02J 3/24* (2006.01)
(Continued)

(52) U.S. Cl.
CPC ................ *H02J 3/16* (2013.01); *H02J 3/241* (2020.01); *H02J 3/28* (2013.01); *H02J 3/46* (2013.01);
(Continued)

(58) Field of Classification Search
CPC ...... H02J 3/381; H02J 3/48; H02J 3/50; H02J 3/38; H02J 3/18; H02J 3/32
See application file for complete search history.

(56) References Cited

FOREIGN PATENT DOCUMENTS

| CN | 112564135 A | * | 3/2021 | |
|---|---|---|---|---|
| CN | 112838614 A | * | 5/2021 | ............ H02J 3/381 |

(Continued)

*Primary Examiner* — Mohammad Ali
*Assistant Examiner* — Dhruvkumar Patel

(57) ABSTRACT

Disclosed are a coordinated control method and system for active support of a new energy power station containing a voltage-controlled source. The method includes: obtaining a working mode and a controlled target value of an external characteristic of a new energy power station, and setting internal parameters of a voltage-controlled source and a current-controlled source in the new energy power station; monitoring a power output state of a controlled unit of a voltage source, and calculating a regulation margin of the voltage source; setting power, inertia, and an objective function and a constraint of multi-source coordinated control of primary frequency modulation (FM)/voltage regulation for the new energy power station, and obtaining controlled allocation logic of a current source based on the objective function and the constraint of the multi-source coordinated control; and setting secondary control logic of each controlled unit and its allocation priority strategy.

12 Claims, 7 Drawing Sheets

(51) Int. Cl.
*H02J 3/28* (2006.01)
*H02J 3/46* (2006.01)
(52) U.S. Cl.
CPC ....... *H02J 2300/24* (2020.01); *H02J 2300/28* (2020.01)

(56) References Cited

FOREIGN PATENT DOCUMENTS

| CN | 113162055 A | * | 7/2021 | ................ H02J 3/16 |
| CN | 113224843 A | * | 8/2021 | |
| CN | 113285493 A | * | 8/2021 | |
| CN | 114759576 A | * | 7/2022 | |

* cited by examiner

COORDINATED CONTROL METHOD AND SYSTEM FOR ACTIVE SUPPORT OF NEW ENERGY POWER STATION CONTAINING VOLTAGE-CONTROLLED SOURCE

TECHNICAL FIELD

The present disclosure relates to the technical field of coordinated control of new energy power stations, and specifically, to a coordinated control method and system for active support of a new energy power station containing a voltage-controlled source.

BACKGROUND

A new energy power station including a wind power device, a photovoltaic (PV) device, an energy storage device, a static var generator (SVG), and the like is often composed of devices produced by a plurality of manufacturers of different brands, which results in insufficient response time of the new energy power station for frequency and active power changes of a power grid, causing poorer security and stability of the power grid. This architecture has the following shortcomings:

1. A power control device of each energy source can only adjust its own energy power independently, without comprehensively considering optimal power regulation. If an active power output of a single device fluctuates due to weather or other reasons, active power inevitably cannot be used to effectively track an active automatic generation control (AGC) instruction value. This results in a loss of a generating capacity of a power station, and even affects evaluation of the power grid on the power station.

2. If a primary frequency modulation (FM) dead zone of a regional power grid is too small, or a frequency of the power grid fluctuates too frequently, a unit is unable to operate in a maximum power tracking state for a long time, and a device needs to run frequently for a long time, aggravating wear of the device and reducing reliability.

3. In case power of the new energy power station is not limited, when a low-frequency disturbance occurs in the power grid, the new energy power station cannot regulate active power positively due to natural environmental factors. As a result, power output needs to be cut down to respond to the low-frequency disturbance in the power grid, thus causing an economic loss to the power station.

4. Since an original design and technology of a device in a new energy power station that has been put into operation cannot quickly regulate a power generation output, even if transformation is carried out, an FM effect may not be reflected perfectly, which may require secondary transformation.

5. Active support capabilities of a traditional new energy power station, such as AGC/automatic voltage control (AVC), primary FM, inertia support, and energy management, are independently completed by different devices, which causes a data island between the devices. The devices can be coordinated only through communication, which affects speeds of FM and voltage regulation and reduces system reliability.

6. An existing new energy power station often contains merely a current-controlled source, lacking a coordinated control method and system for a new energy power station containing a voltage-controlled source. With the promotion of China's carbon peaking and carbon neutrality goals and construction of a new power system, a system powered completely by new energy will continue to emerge. The system is often characterized by a low short circuit ratio. The traditional new energy power station based on the current-controlled source will not meet an operation requirement of the system, given that the traditional new energy power station cannot autonomously establish a voltage frequency due to an external characteristic of the current source. By contrast, the new energy power station containing the voltage-controlled source can effectively provide voltage and frequency reference quantities, maintain stability of a grid connection point and the whole power system, especially a system powered completely by new energy and not supported by a large power grid. Therefore, a new energy power station containing a voltage source can provide the active support capabilities for the system and thus has broad prospects. However, a current coordinated control system for the power station mainly adopts constant active power control and constant reactive power control, which is suitable for a new energy power station containing only a current source. For a new energy power station containing both the voltage source and the current source, external active and reactive power of the voltage source cannot be controlled. Therefore, a traditional control method based on active and reactive power allocation has big problems, and cannot support the system to realize primary FM, voltage regulation, and inertia support autonomously.

SUMMARY

The present disclosure is intended to provide a coordinated control method and system for active support of a new energy power station containing a voltage-controlled source, to represent an external characteristic of a new energy power station as a voltage-source or current-source new energy power station, and improve active support capabilities of the new energy power station.

Embodiments of the present disclosure provide a coordinated control method for active support of a new energy power station containing a voltage-controlled source, including the following steps:

obtaining a working mode and a controlled target value of an external characteristic of a new energy power station based on operation and control instructions of dispatching and source network load storage, and setting internal parameters of a voltage-controlled source and a current-controlled source in the new energy power station based on the working mode of the external characteristic of the new energy power station;

monitoring a power output state of a controlled unit of a voltage source, and calculating a regulation margin of the voltage source;

setting power, inertia, and an objective function and a constraint of multi-source coordinated control of primary FM/voltage regulation for the new energy power station based on a total target value of the external characteristic of the new energy power station, and obtaining controlled allocation logic of a current source based on the objective function and constraint of the multi-source coordinated control; and setting secondary control logic of each controlled unit and its allocation priority strategy based on the regulation margin of the voltage source and the controlled allocation logic of the current source.

Further, the setting internal parameters of a voltage-controlled source and a current-controlled source in the new energy power station based on the working mode of the external characteristic of the new energy power station specifically includes the following steps:

1) if the new energy power station works in a voltage source mode, and the external characteristic is represented as a voltage (V)/frequency (f) control mode, disabling a phase-locked loop function of the current-controlled source, using the voltage-controlled source to generate a phase angle, and setting inertia and modulation parameters of primary FM for the voltage-controlled source, where a voltage dead zone is ±0.02 pu, and an FM dead zone is ±0.05 Hz; and 2) if the new energy power station works in a current source mode, and the external characteristic is represented as a constant active and reactive power control mode, disabling a primary FM function of the voltage-controlled source, setting active power to be constant, setting reactive power to be in a constant voltage mode, enabling the phase-locked loop function of the current-controlled source, and using a phase angle generated by a large power grid.

Further, the power output state of the controlled unit of the voltage source specifically includes: active power, reactive power, and voltage and power factors of a grid connection point, real-time active power, real-time reactive power, theoretically available power, and state information of a wind turbine, real-time active power, real-time reactive power, theoretically available power, and state information of a PV system, real-time active power, current capacity and state information of an energy storage system, and real-time reactive power, a port voltage, and state information of an SVG.

Further, the calculating a regulation margin of the voltage source specifically includes:

calculating an active power compensative ratio according to formula (1), a reactive power compensative ratio according to formula (2), and a response time constant of virtual inertia according to formula (3):

$$\delta \% = \frac{P_0 - P'_e}{\Delta f - f_d} \times \frac{f_N}{P_N} \quad (1)$$

$$V \% = \frac{U_0 - U_e}{\Delta U - U_d} \times \frac{U_N}{Q_N} \quad (2)$$

$$T_J \approx -\frac{\Delta P \cdot f_N}{P_N} / \frac{df}{dt} \quad (3)$$

where $\delta\%$ represents the active power compensative ratio, $\Delta f$ represents a difference between a current frequency and a rated frequency, $P'_e$ represents a target value of output active power at frequency f, $P_0$ represents an initial value of the output active power, $P_N$ represents rated active power of the power station, and $f_d$ represents a response dead zone of primary FM (in units of Hz);

$V\%$ represents the reactive power compensative ratio, $U_0$ represents an initial value of an output voltage, $U_e$ represents a current voltage, $\Delta U$ represents a difference between the current voltage and a rated voltage, $U_N$ represents a nominal voltage, $Q_N$ represents rated reactive power, and $U_d$ represents a dead zone of primary voltage regulation; and $T_J$ represents a response time constant of virtual inertia of a new energy generator unit, f represents a frequency of a grid connection point of the new energy generator unit, $f_N$ represents a rated frequency of the new energy generator unit, $\Delta P$ represents a change of active power of the new energy generator unit, $P_N$ represents rated active power of the new energy generator unit, and t represents time.

Further, the objective function and the constraint of the multi-source coordinated control are as follows:

$$\min_{P_g, Q_g} \sum_i f_{1i}(P_{gi}) + f_{2i}(Q_{gi}) \quad (4)$$

$$\begin{cases} \text{s.t. } P_i(\theta, V) + P_{gi} - P_{di} - P_e = 0, \quad Q_i(\theta, V) + Q_{gi} - Q_{di} - Q_e = 0 \\ \delta_i \% \times P_{i,N} \times N - \delta \% \times P_N = 0, \quad V_i \% \times Q_{i,N} \times N - V \% \times Q_N = 0 \\ (P_i, Q_i, V_i)^{min} \leq (P_{gi}, Q_{gi}, V_{gi}) \leq (P_i, Q_i, V_i)^{max} \\ (\delta_i^{min} \%, V_i^{min} \%, T_{Ji}^{min}) \leq (\delta_i \%, V_i \%, T_{Ji}) \leq (\delta_i^{max} \%, V_i^{max} \%, T_{Ji}^{max}) \end{cases} \quad (5)$$

where formula (4) represents the objective function of the multi-source coordinated control, and formula (5) represents the constraint; and min represents a minimum value, max represents a maximum value, $P_g$ represents a power output of an active unit of the current source, and $Q_g$ represents a power output of a reactive unit of the current source; $f_{1i}$ represents an economic coefficient between a cost and the active power, $f_{2i}$ represents an economic coefficient between the cost and the reactive power, and i represents a node, where i=1, 2, 3, ..., N; $P_{gi}$ represents a power output of an active unit of each current source, and $Q_{gi}$ represents a power output of a reactive unit of each current source; $P_{di}$ represents an active load of the node, and $Q_{di}$ represents a reactive load of the node; $P_i(\theta,V)$ represents a power output of an active unit of the voltage source, $Q_i(\theta,V)$ represents a power output of a reactive unit of the voltage source, and $\theta,V$ represent a power angle and a phase respectively; $V_{gi}$ represents a voltage at an output port of a controlled source; $P_e$ represents detected output active power, and $Q_e$ represents detected output reactive power; $\delta_i\%$ represents a coefficient of primary FM, $V_i\%$ represents a coefficient of primary voltage regulation, and $T_{Ji}$ represents an inertia coefficient; and $P_{i,N}$ represents active power of an $i^{th}$ node in N nodes, $Q_{i,N}$ represents reactive power of the $i^{th}$ node in the N nodes, and $(P_i, Q_i, V_i)$ represent the active power, the reactive power, and a voltage of the $i^{th}$ node.

Further, the setting secondary control logic of each controlled unit and its allocation priority strategy specifically includes:

at an initial stage of starting primary FM and virtual inertia response, using an energy storage system to undertake a regulation of primary FM and virtual inertia, and gradually transiting to use a wind turbine and a PV device to undertake an active power regulation, and use the energy storage system to supplement a power output fluctuation caused by instability of wind and optical power and overshooting of the wind turbine and an inverter; and at an initial stage of starting primary voltage regulation and reactive quick response, using an SVG system to undertake a regulation of reactive power and primary voltage, and gradually transiting to use the wind turbine and the PV device to undertake a regulation of reactive power and primary voltage, and use the SVG system to supplement a reactive power output fluctuation caused by the instability of the wind and optical power and overshooting of the wind turbine and the inverter, so as to stably regulate target power.

The embodiments of the present disclosure further provide a coordinated control system for active support of a new energy power station containing a voltage-controlled source, including:

parameter setting module configured to obtain a working mode and a controlled target value of an external characteristic of a new energy power station based on operation and control instructions of dispatching and source network load storage, and set internal parameters of a voltage-controlled source and a current-controlled source in the new energy power station based on the working mode of the external characteristic of the new energy power station;

a voltage source regulation margin calculation module configured to monitor a power output state of a controlled unit of a voltage source, and calculate a regulation margin of the voltage source;

a module for obtaining controlled allocation logic of a current source configured to set power, inertia, and an objective function and a constraint of multi-source coordinated control of primary FM/voltage regulation for the new energy power station based on a total target value of the external characteristic of the new energy power station, and obtain the controlled allocation logic of the current source based on the objective function and constraint of the multi-source coordinated control; and an allocation setting module configured to set secondary control logic of each controlled unit and its allocation priority strategy based on the regulation margin of the voltage source and the controlled allocation logic of the current source.

Further, the module for obtaining the controlled allocation logic of the current source is specifically configured to set the following objective function and constraint of the multi-source coordinated control:

$$\min_{P_g, Q_g} \sum_i f_{1i}(P_{gi}) + f_{2i}(Q_{gi}) \quad (4)$$

$$\begin{cases} \text{s.t. } P_i(\theta, V) + P_{gi} - P_{di} - P_e = 0, \quad Q_i(\theta, V) + Q_{gi} - Q_{di} - Q_e = 0 \\ \delta_i \% \times P_{i,N} \times N - \delta \% \times P_N = 0, \quad V_i \% \times Q_{i,N} \times N - V \% \times Q_N = 0 \\ (P_i, Q_i, V_i)^{min} \leq (P_{gi}, Q_{gi}, V_{gi}) \leq (P_i, Q_i, V_i)^{max} \\ (\delta_i^{min} \%, V_i^{min} \%, T_{Ji}^{min}) \leq (\delta_i \%, V_i \%, T_{Ji}) \leq (\delta_i^{max} \%, V_i^{max} \%, T_{Ji}^{max}) \end{cases} \quad (5)$$

where formula (4) represents the objective function of the multi-source coordinated control, and formula (5) represents the constraint; and min represents a minimum value, max represents a maximum value, $P_g$ represents a power output of an active unit of the current source, and $Q_g$ represents a power output of a reactive unit of the current source; $F_{1i}$ represents an economic coefficient between a cost and the active power, $F_{2i}$ represents an economic coefficient between the cost and the reactive power, and i represents a node, where i=1, 2, 3, . . . , N; $P_{gi}$ represents a power output of an active unit of each current source, and $Q_{gi}$ represents a power output of a reactive unit of each current source; $P_{di}$ represents an active load of the node, and $Q_{di}$ represents a reactive load of the node; $P_i(\theta,V)$ represents a power output of an active unit of the voltage source, $Q_i(\theta,V)$ represents a power output of a reactive unit of the voltage source, and $\theta,V$ represent a power angle and a phase respectively; $V_{gi}$ represents a voltage at an output port of a controlled source; $P_e$ represents detected output active power, and $Q_e$ represents detected output reactive power; $\delta_i\%$ represents a coefficient of primary FM, $V_i\%$ represents a coefficient of primary voltage regulation, and $T_{Ji}$ represents an inertia coefficient; and $P_{i,N}$ represents active power of an $i^{th}$ node in N nodes, $Q_{i,N}$ represents reactive power of the $i^{th}$ node in the N nodes, and $(P_i,Q_i,V_i)$ represent the active power, the reactive power, and a voltage of the $i^{th}$ node.

The embodiments of the present disclosure further provide an electronic device, including a memory, a processor, and a computer program stored in the memory and executable on the processor, where the processor executes the computer program to implement the foregoing coordinated control method for active support of a new energy power station containing a voltage-controlled source.

The embodiments of the present disclosure further provide a non-transient computer-readable storage medium, where the non-transient computer-readable storage medium stores a computer program, and the computer program is executed by a processor to implement the foregoing coordinated control method for active support of a new energy power station containing a voltage-controlled source.

By coordinating controlled units such as a voltage-source new energy unit, a current-source new energy unit, an energy storage unit, an SVG for dynamic reactive power compensation in the new energy power station, the embodiments of the present disclosure can represent the external characteristic of the new energy power station as a voltage-source/current-source new energy power station, so as to realize primary FM (with a power up-regulation capability), primary voltage regulation, inertia support, reverse reactive power absorption, voltage support with a low short circuit ratio, and other functions of the whole power station, thereby improving active support capabilities of the new energy power station.

DETAILED DESCRIPTION

In order to make the objectives, technical solutions and advantages of the embodiments of the present disclosure clearer, the following clearly and completely describes the technical solutions in the embodiments of the present disclosure with reference to accompanying drawings in the embodiments of the present disclosure. Apparently, the described examples are some rather than all of the embodiments of the present disclosure. All other embodiments obtained by those of ordinary skill in the art based on the embodiments of the present disclosure without making inventive efforts shall fall within the scope of protection of the present disclosure.

Figure 7:
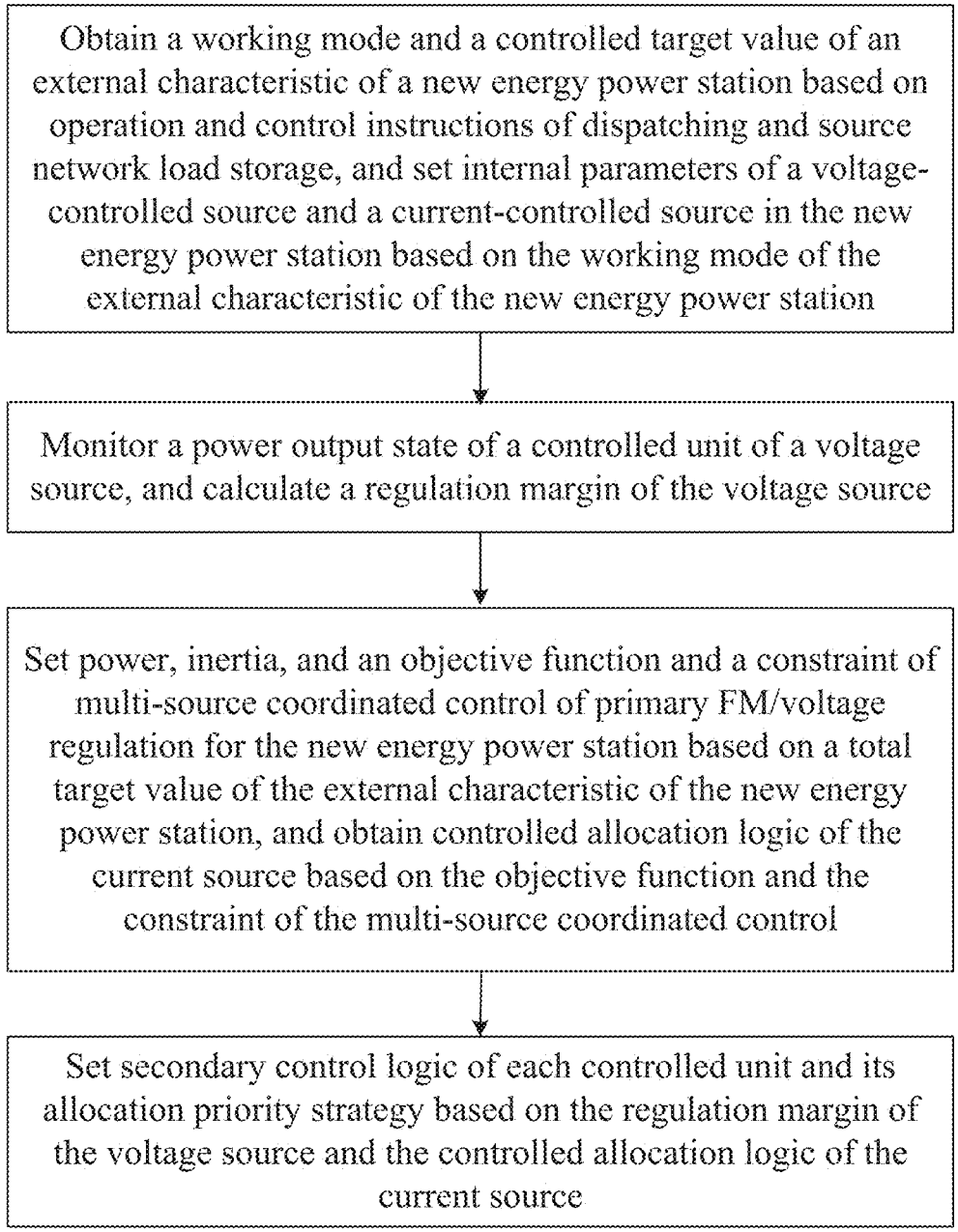
FIG. 7 is a schematic flowchart of a coordinated control method for active support of a new energy power station containing a voltage-controlled source according to an embodiment of the present disclosure.

Referring to FIG. 7, the embodiments of the present disclosure provide a coordinated control method for active support of a new energy power station containing a voltage-controlled source, including the following steps.

Step 1: Obtain a working mode and a controlled target value of an external characteristic of a new energy power station based on operation and control instructions of dispatching and source network load storage, and set internal parameters of a voltage-controlled source and a current-controlled source in the new energy power station.

The operation and control instructions include a primary FM instruction, a primary voltage regulation instruction (delivered by a source network load storage system or a dispatching center), and an active AGC/reactive AVC instruction. The active AGC/reactive AGC instruction is remotely obtained by a coordinated control apparatus of the power station from a master station in the dispatching center.

The setting internal parameters of a voltage-controlled source and a current-controlled source in the new energy power station based on the working mode of the external characteristic of the new energy power station specifically includes the following steps:

1) If the new energy power station works in a voltage source mode, and the external characteristic is represented as a voltage (V)/frequency (f) control mode, disable a phase-locked loop function of the current-controlled source, use the voltage-controlled source to generate a phase angle, and set inertia and modulation parameters of primary FM for the voltage-controlled source, where a voltage dead zone is ±0.02 pu, and an FM dead zone is ±0.05 Hz.

2) If the new energy power station works in a current source mode, and the external characteristic is represented as a constant active and reactive power control mode, disable a primary FM function of the voltage-controlled source, set active power to be constant, set reactive power to be in a constant voltage mode, enable the phase-locked loop function of the current-controlled source, and use a phase angle generated by a large power grid.

An output voltage can be specified as required for a voltage source inverter and a current source inverter. When a port voltage of the inverter deviates from the specified voltage, the inverter automatically regulates output reactive power based on a droop curve to support a support voltage.

A rated frequency can be specified for the voltage source inverter. When a port frequency of the voltage source inverter deviates from the specified rated frequency, the voltage source inverter automatically regulates its output active power based on the droop curve to support a frequency of a power grid.

When a current source is used, an active power limit value can be directly specified for active power. When the active power limit value does not exceed maximum output power of the inverter, an error between actual output active power of the inverter and the active power limit value is not more than ±1% of the national standard.

Step 2: Monitor a power output state of a controlled unit of a voltage source, and calculate a regulation margin of the voltage source.

The power output state of the controlled unit of the voltage source specifically includes: active power, reactive power, and voltage and power factors of a grid connection point, real-time active power, real-time reactive power, theoretically available power, and state information of a wind turbine, real-time active power, real-time reactive power, theoretically available power, and state information of a PV system, real-time active power, current capacity and state information of an energy storage system, and real-time reactive power, a port voltage, and state information of an SVG.

Figure 1:
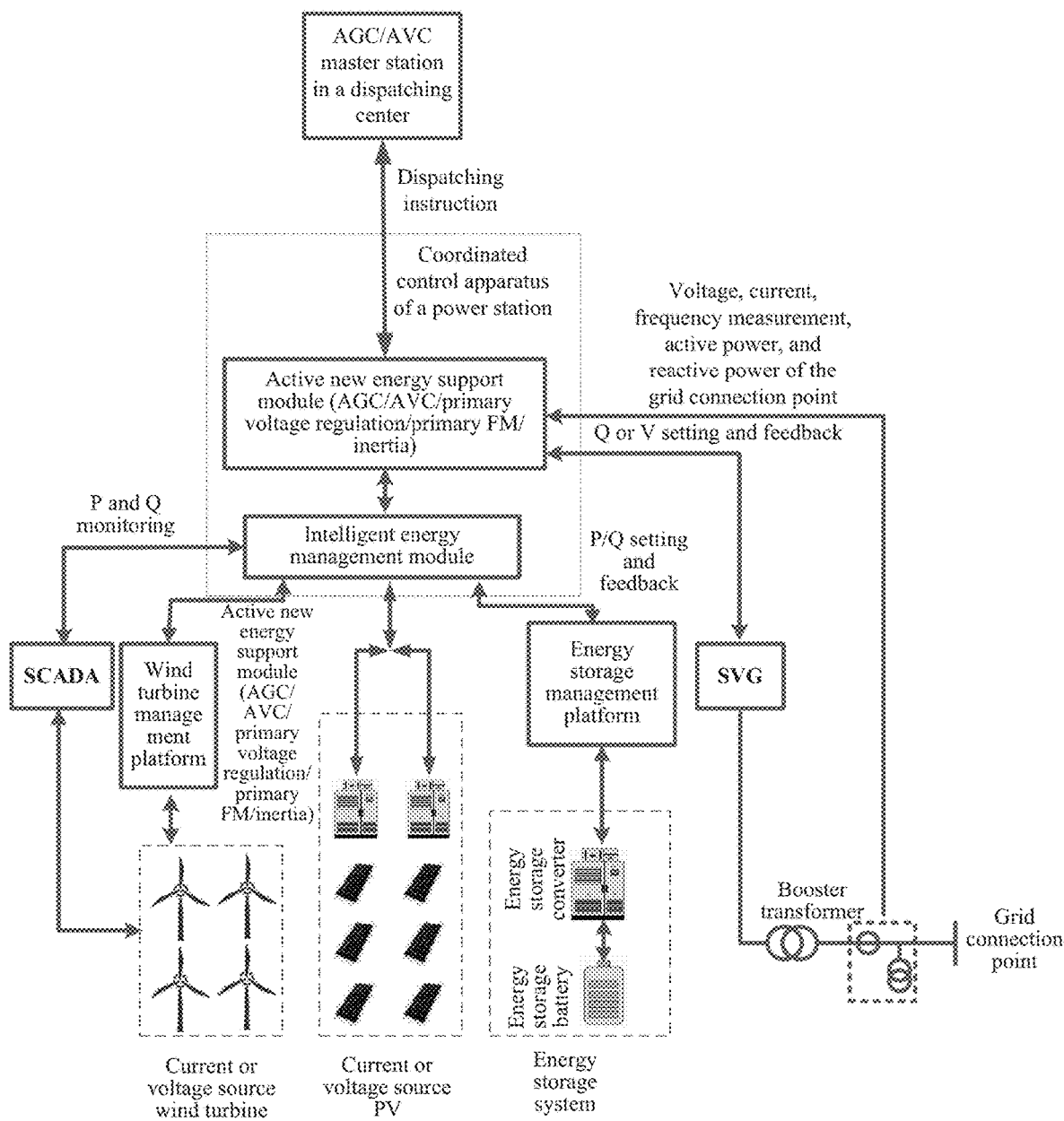
FIG. 1 is a logical measurement and control diagram of a power station system according to an embodiment of the present disclosure.
Figure 2:
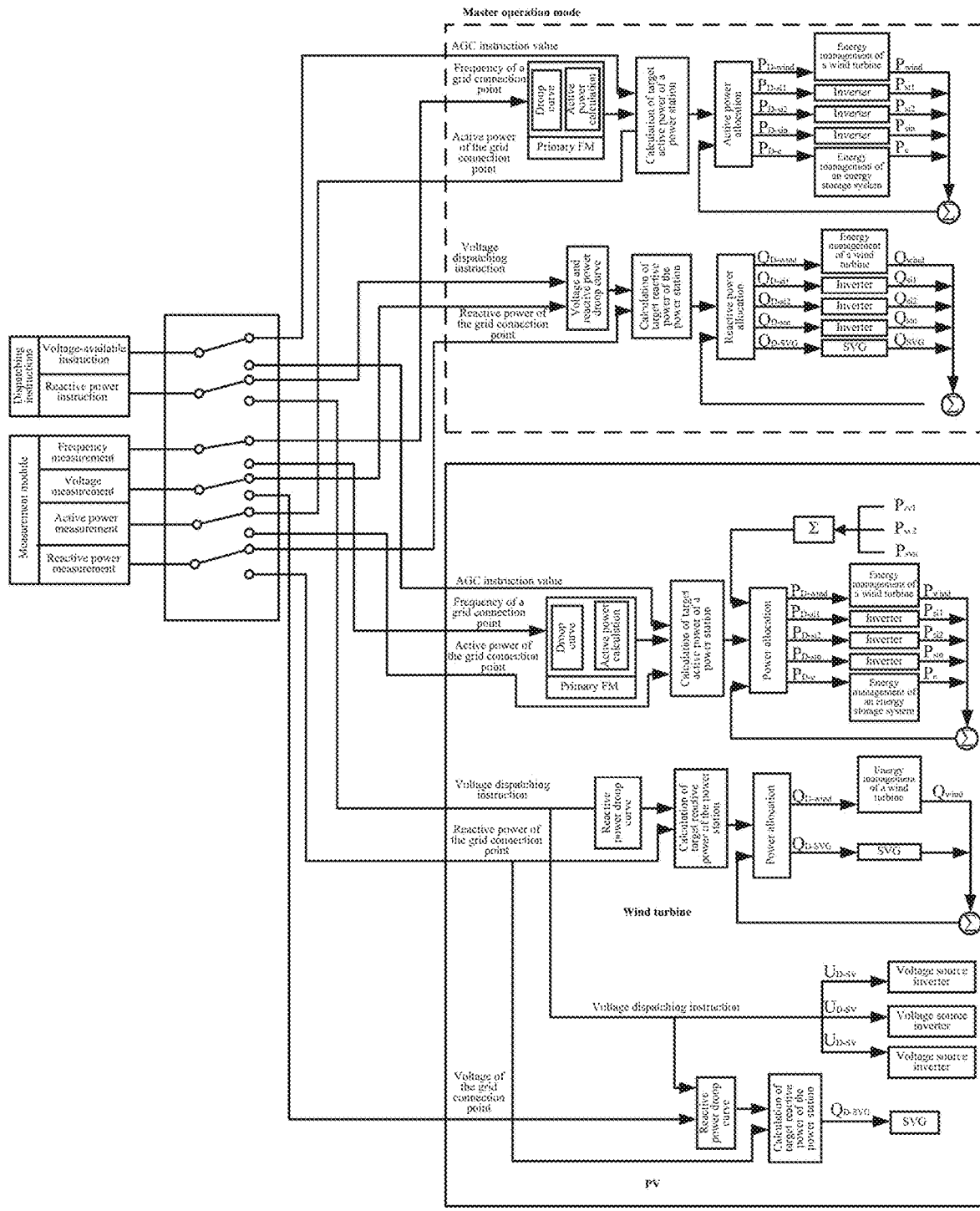
FIG. 2 is a logical control block diagram of a power station system according to an embodiment of the present disclosure.
Figure 3:
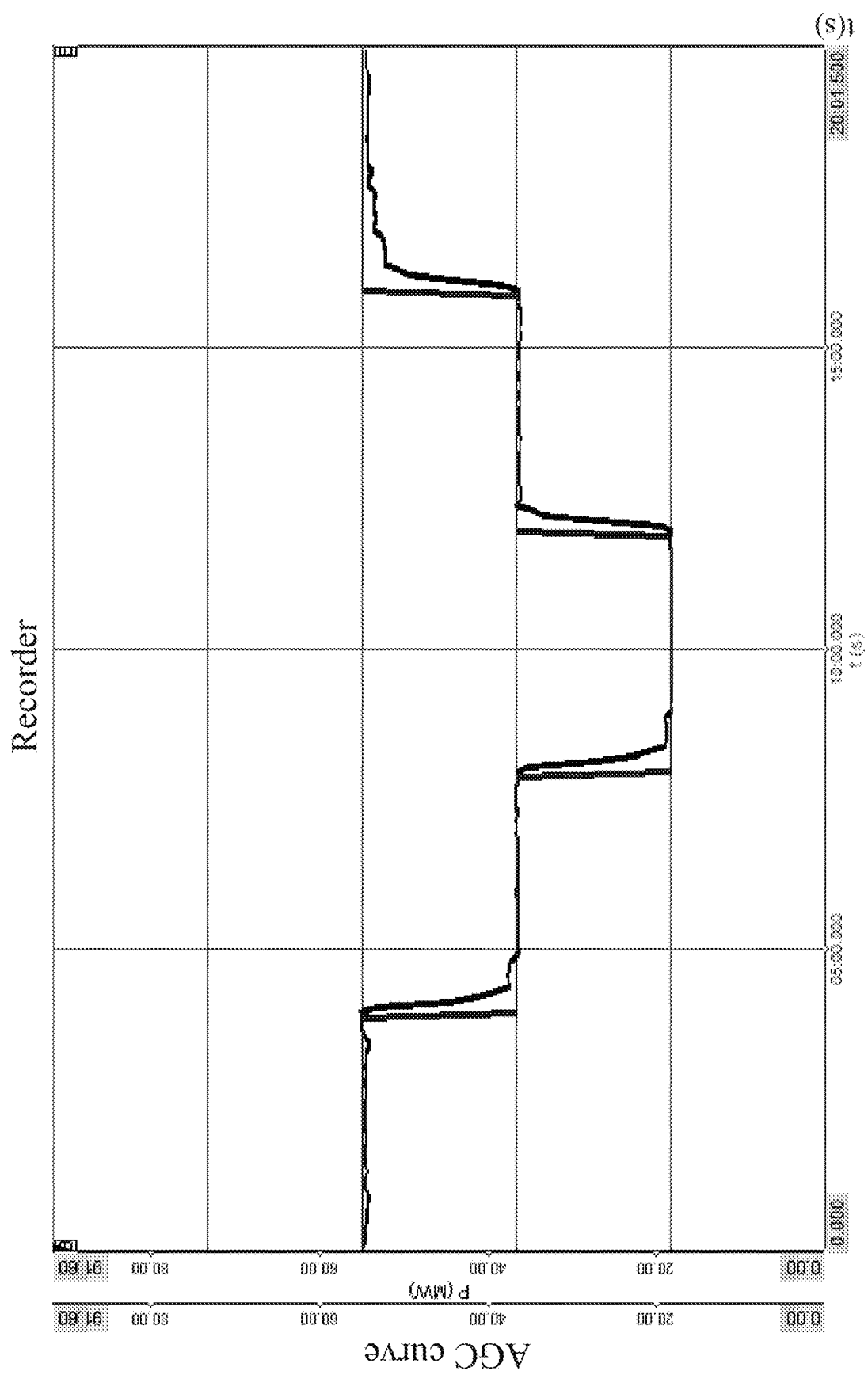
FIG. 3 is a field test diagram of an active power control capability according to an embodiment of the present disclosure.
Figure 4:
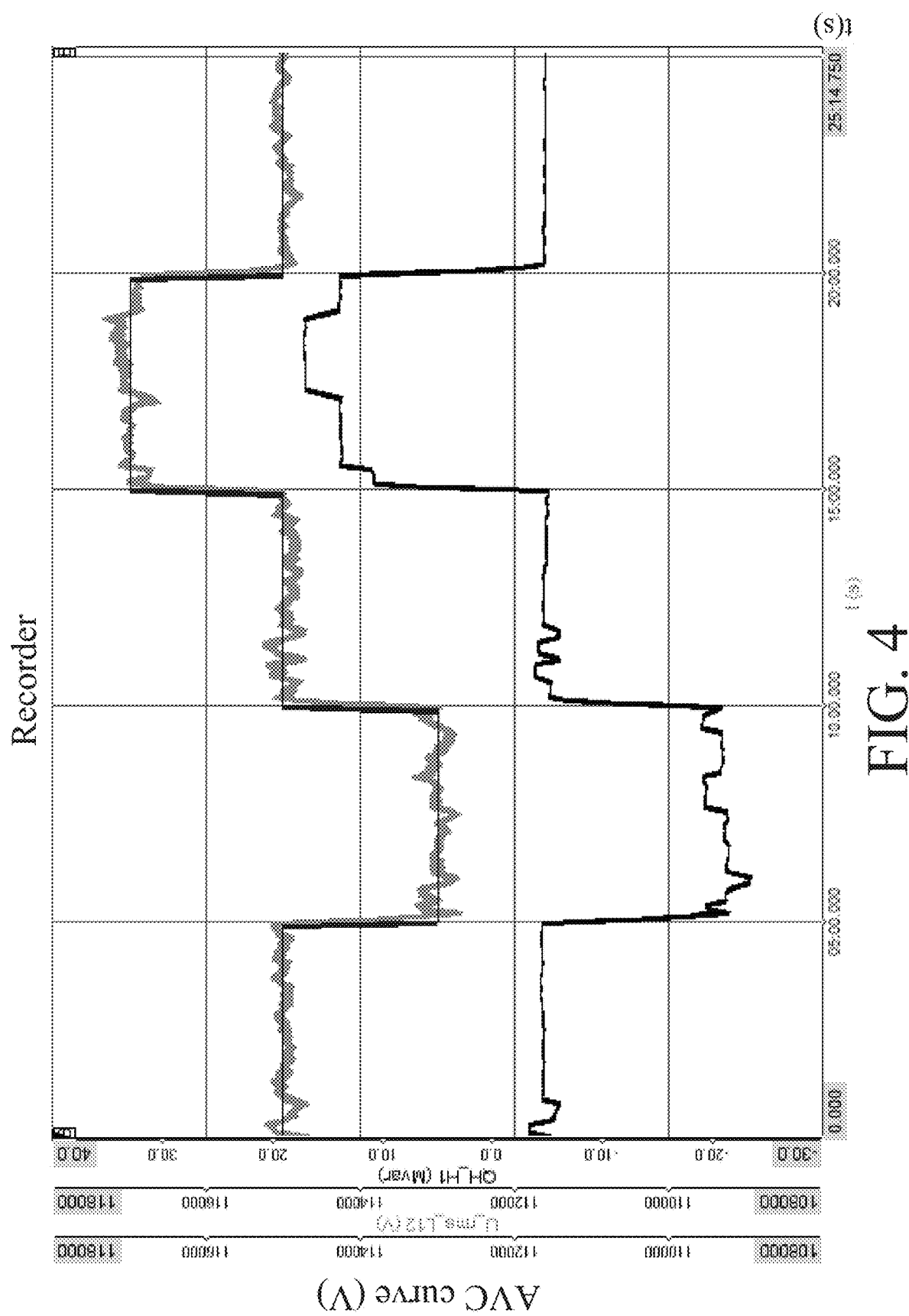
FIG. 4 is a field test diagram of a reactive power control capability according to an embodiment of the present disclosure.
Figure 5:
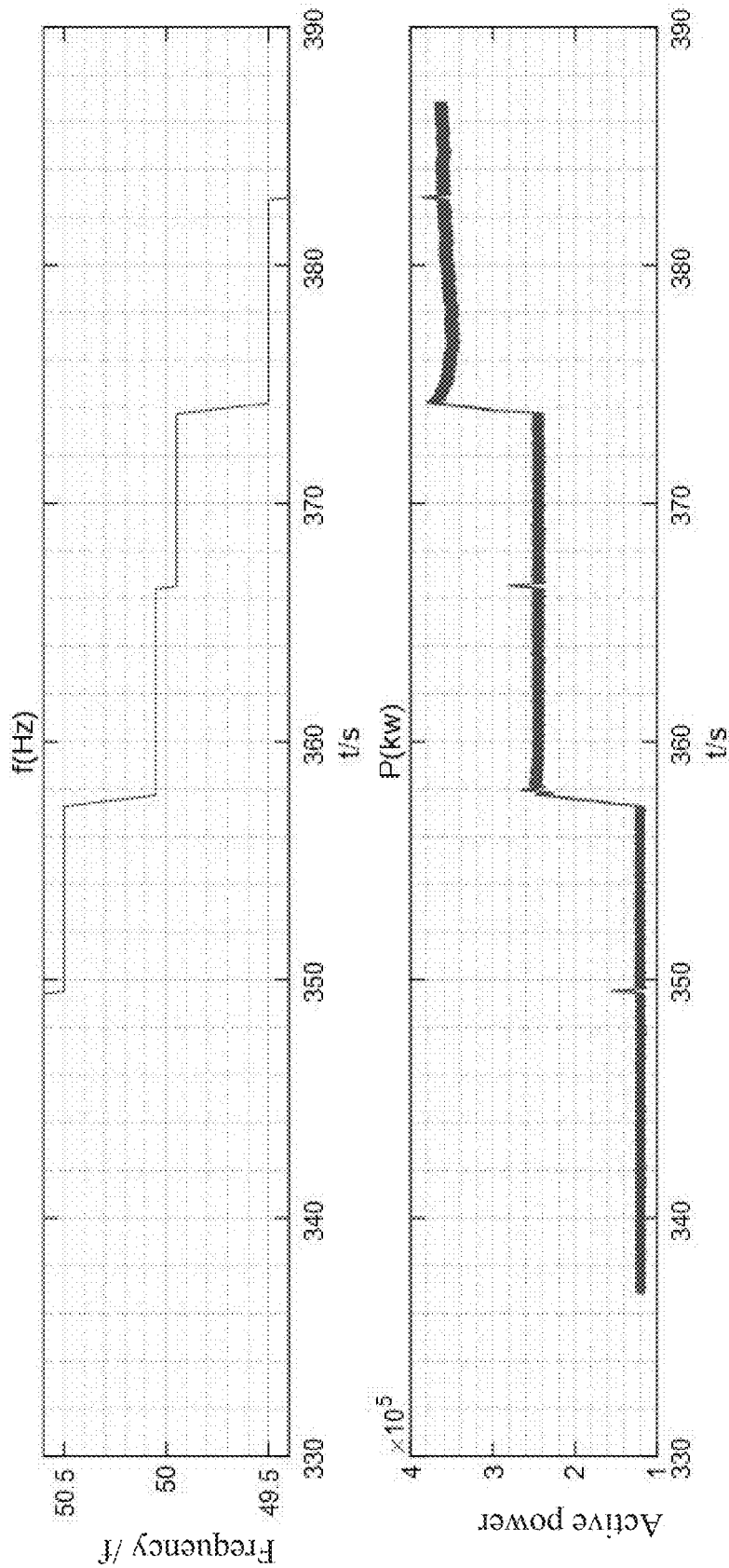
FIG. 5 is a field test diagram of a regulation control capability of primary FM according to an embodiment of the present disclosure.
Figure 6:
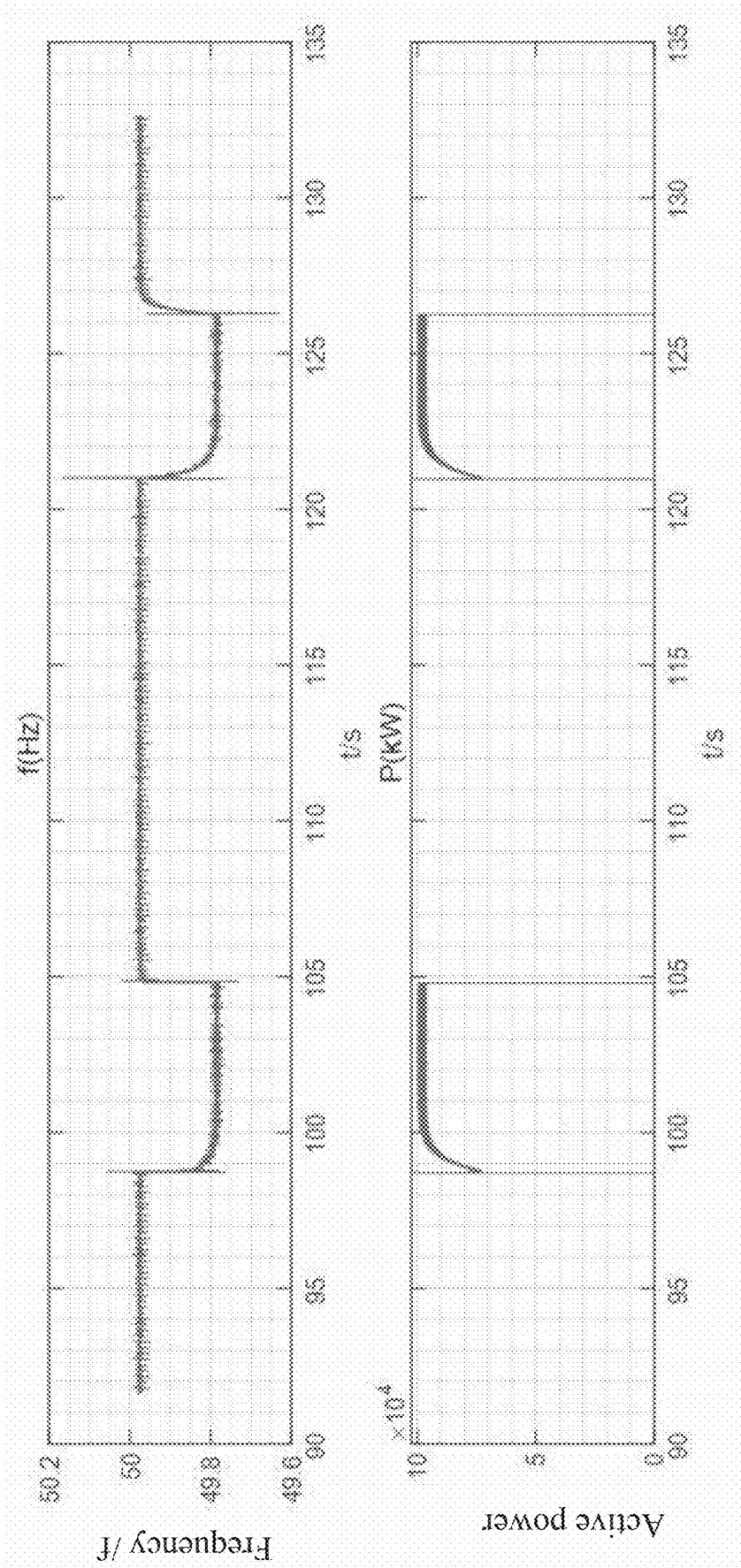
FIG. 6 is a field test diagram of an inertia regulation control capability according to an embodiment of the present disclosure.

As shown in FIG. 1, the coordinated control apparatus of the power station includes an active new energy support module and an intelligent energy management module. The active new energy support module collects voltage, current and frequency signals of the grid connection point, and calculates the active power, the reactive power, and the voltage and power factors.

The coordinated control apparatus of the power station performs data communication with a wind turbine management platform by using Modbus TCP or IEC 104. Data uploaded by the wind turbine management platform includes the real-time active power, the real-time reactive power, the theoretically available power, the state information, and the like. Data received by the wind turbine management platform includes target active power, target reactive power, a start instruction, and a stop instruction.

The coordinated control apparatus of the power station communicates with the PV system by using Modbus TCP. Data uploaded by each inverter includes the real-time active power, the real-time reactive power, the theoretically available power, the state information, and the like. Data received by the inverter includes target active power, target reactive power, a start instruction, and a stop instruction.

The coordinated control apparatus of the power station communicates with the energy storage system by using Modbus TCP. Data uploaded by the energy storage system includes the real-time active power and the current capacity and state information of the energy storage system. Data received by the energy storage system includes target active power, a start instruction, and a stop instruction.

The coordinated control apparatus of the power station communicates with the SVG by using Modbus TCP/RTU. Data uploaded by the SVG includes the real-time reactive power, the port voltage of the SVG, the state information, and the like. Data received by the SVG includes target reactive power.

The coordinated control apparatus of the power station communicates with AGC and AVC points by using IEC104, and the following table shows reference points.

TABLE 1

List of AGC points
AGC points

| Type | SN | Content | Remarks |
|---|---|---|---|
| Remote control | 1 | Active power of an AGC object | Active power corresponding to the AGC object (the master station in the dispatching center takes active power of a grid connection point of a new energy power station as the AGC object) |
| | 2 | Adjustable upper active power limit of the AGC object | Upper active power limit that the AGC object can reach under current environmental and meteorological conditions |
| | 3 | Adjustable lower active power limit of the AGC object | Suggested adjustable lower limit provided by a wind power station to a remote control object through AGC when the wind turbine is not stopped, namely, adjustable lower limit under a high wind speed |
| | 4 | Returned value of an AGC instruction | The power station returns the AGC instruction delivered by the master station in the dispatching center to the master station in the dispatching center. |
| Remote signaling | 5 | AGC function enabling/disabling signal | AGC function enabling/disabling signal of the power station:<br>ON: The AGC function is enabled.<br>OFF: The AGC function is disabled. |
| | 6 | Remote/local AGC signal | Remote/local AGC signal of the power station:<br>ON: The AGC function of the power station is in a remote control mode, in other words, is controlled by the master station in the dispatching center.<br>OFF: The AGC function of the power station is no longer controlled by the master station in the dispatching center. |
| | 7 | Disabling of a power output increase function | ON: disabled, which means that the active power of the AGC object of the new energy power station cannot be upward regulated at present. |
| | 8 | Disabling of a power output decrease function | ON: disabled, which means that the active power of the AGC object of the new energy power station cannot be downward regulated at present. |
| | 9 | AGC enabling/disabling (keeping) request | After receiving a remote AGC enabling/disabling request command delivered by the master station in the dispatching center, the power station keeps the command and sends a signal after the keeping to the master station in the dispatching center. |
| Remote control | 10 | AGC enabling/disabling request command | ON: request for enabling a remote AGC state;<br>OFF: request for disabling the AGC remote state. |
| | 11 | AGC instruction | Target value of active power control that is delivered by the master station in the dispatching center. The AGC function of the power station allocates and regulates the active power according to the instruction to complete tracking of the instruction of the master station. |

TABLE 2

List of AVC points
AVC points

| Type | SN | Content | Remarks |
|---|---|---|---|
| Remote control | 1 | Increasable reactive power of an AVC slave station | |
| | 2 | Deductible reactive power of the AVC slave station | |
| | 3 | Current total reactive power output of the AVC slave station | A negative value represents an inductive reactive power output, and a positive value represents a capacitive reactive power output. |
| | 4 | Maximum capacitive reactive power capacity that can be provided on site | It is represented by a positive value. |
| | 5 | Maximum inductive reactive power capacity that can be provided on site | It is represented by a positive value. |
| Remote signaling | 6 | AVC function enabling/disabling signal | AVC function enabling/disabling signal of the power station:<br>ON: The AVC function is enabled.<br>OFF: The AVC function is disabled. |

TABLE 2-continued

List of AVC points

| Type | SN | Content | Remarks |
|---|---|---|---|
| | 7 | Remote/local AVC signal | Remote/local AVC signal of the power station: ON: The AVC function of the power station is in the remote control mode, in other words, is controlled by the master station in the dispatching center. OFF: The AVC function of the power station is no longer controlled by the master station in the dispatching center. |
| | 8 | Disabling of a reactive power increase function of the AVC slave station | ON: disabled, which means that reactive power of an AVC object of the new energy power station cannot be upward regulated at present. |
| | 9 | Disabling of a reactive power decrease function of the AVC slave station | ON: disabled, which means that the reactive power of the AVC object of the new energy power station cannot be downward regulated at present. |
| | 10 | Voltage/Reactive power control mode of the AVC slave station | 0 indicates a reactive power mode, and 1 indicates a voltage mode |
| Remote regulation | 11 | Target voltage of an AVC bus on a high-voltage side | Unit: kV |
| | 12 | Reference reactive power of the AVC bus on the high-voltage side | Unit: MVar |

The calculating a regulation margin of the voltage source specifically includes:

calculating an active power compensative ratio according to formula (1), a reactive power compensative ratio according to formula (2), and a response time constant of virtual inertia according to formula (3):

$$\delta \% = \frac{P_0 - P'_e}{\Delta f - f_d} \times \frac{f_N}{P_N} \quad (1)$$

$$V \% = \frac{U_0 - U_e}{\Delta U - U_d} \times \frac{U_N}{Q_N} \quad (2)$$

$$T_J \approx -\frac{\Delta P \cdot f_N}{P_N} \Big/ \frac{df}{dt} \quad (3)$$

In the above formulas, $\delta\%$ represents the active power compensative ratio, $\Delta f$ represents a difference between a current frequency and a rated frequency, $P'_e$ represents a target value of output active power at frequency f, $P_0$ represents an initial value of the output active power, $P_N$ represents rated active power of the power station, and $f_d$ represents a response dead zone of primary FM (in units of Hz);

$V\%$ represents the reactive power compensative ratio, $U_0$ represents an initial value of an output voltage, $U_e$ represents a current voltage, $\Delta U$ represents a difference between the current voltage and a rated voltage, $U_N$ represents a nominal voltage, $Q_N$ represents rated reactive power, and $U_d$ represents a dead zone of primary voltage regulation; and $T_J$ represents a response time constant of virtual inertia of a new energy generator unit, f represents a frequency of a grid connection point of the new energy generator unit, $f_N$ represents a rated frequency (50 Hz) of the new energy generator unit, $\Delta P$ represents a change of active power of the new energy generator unit (in units of k), and $P_N$ represents rated active power of the new energy generator unit (in units of k).

Relevant information of a booster station can be obtained from an integrated automation system of a substation. The active power compensative ratio is calculated according to formula (1), the reactive power compensative ratio is calculated according to formula (2), and the response time constant of the virtual inertia is calculated according to formula (3).

Step 3: Set power, inertia, and an objective function and a constraint of multi-source coordinated control of primary FM/voltage regulation for the new energy power station based on a total target value of the external characteristic of the new energy power station, and obtain controlled allocation logic of the current source based on the objective function and the constraint of the multi-source coordinated control.

The objective function and the constraint of the multi-source coordinated control are as follows:

$$\min_{P_g, Q_g} \sum_i f_{1i}(P_{gi}) + f_{2i}(Q_{gi}) \quad (4)$$

$$\begin{cases} \text{s.t. } P_i(\theta, V) + P_{gi} - P_{di} - P_e = 0, \quad Q_i(\theta, V) + Q_{gi} - Q_{di} - Q_e = 0 \\ \delta_i \% \times P_{i,N} \times N - \delta \% \times P_N = 0, \quad V_i \% \times Q_{i,N} \times N - V \% \times Q_N = 0 \\ (P_i, Q_i, V_i)^{min} \leq (P_{gi}, Q_{gi}, V_{gi}) \leq (P_i, Q_i, V_i)^{max} \\ (\delta_i^{min} \%, V_i^{min} \%, T_{Ji}^{min}) \leq (\delta_i \%, V_i \%, T_{Ji}) \leq (\delta_i^{max} \%, V_i^{max} \%, T_{Ji}^{max}) \end{cases} \quad (5)$$

Formula (4) represents the objective function of the multi-source coordinated control, and formula (5) represents the constraint.

In the above formulas, min represents a minimum value, max represents a maximum value, $P_g$ represents a power output of an active unit of the current source, and $Q_g$ represents a power output of a reactive unit of the current source; $F_{1i}$ represents an economic coefficient between a cost and the active power, $F_{2i}$ represents an economic coefficient between the cost and the reactive power, and i represents a node, where i=1, 2, 3, ..., N; $P_{gi}$ represents a power output of an active unit of each current source, and $Q_{gi}$ represents a power output of a reactive unit of each current source; $P_{di}$ represents an active load of the node, and $Q_{di}$ represents a reactive load of the node; $P_i(\theta,V)$ represents a power output of an active unit of the voltage source, $Q_i(\theta,V)$ represents a power output of a reactive unit of the voltage source, and $\theta,V$ represent a power angle and a phase respectively; $V_{gi}$ represents a voltage at an output port of a controlled source; $P_e$ represents detected output active power, and $Q_e$ represents detected output reactive power; $\delta_i\%$ represents a coefficient of primary FM, $V_i\%$ represents a coefficient of primary voltage regulation, and $T_{Ji}$ represents an inertia coefficient; and $P_{i,N}$ represents active power of an $i^{th}$ node in N nodes, $Q_{i,N}$ represents reactive power of the $i^{th}$ node in the N nodes, and $(P_i, Q_i, V_i)$ represent the active power, the reactive power, and a voltage of the $i^{th}$ node.

Step 4: Set secondary control logic of each controlled unit and its allocation priority strategy based on the regulation margin of the voltage source and the controlled allocation logic of the current source.

In other words, the secondary control logic of each controlled unit and its allocation priority strategy are set based on the obtained regulation margin of the voltage source in step 2 and the calculated controlled allocation logic of the current source in step 3.

The setting secondary control logic of each controlled unit and its allocation priority strategy specifically includes:

at an initial stage of starting primary FM and virtual inertia response, using the energy storage system to undertake the regulation of primary FM and virtual inertia, and gradually transiting to use a wind turbine and a PV device to undertake the active power regulation, and use the energy storage system to supplement a power output fluctuation caused by instability of wind and optical power and overshooting of the wind turbine and the inverter; and at an initial stage of starting primary voltage regulation and reactive quick response, using an SVG system to undertake the regulation of reactive power and primary voltage, and gradually transiting to use the wind turbine and the PV device to undertake the regulation of reactive power and primary voltage, and use the SVG system to supplement a reactive power output fluctuation caused by the instability of the wind and optical power and overshooting of the wind turbine and the inverter, so as to stably regulate target power.

As shown in FIG. 2 to FIG. 6, where FIG. 3 to FIG. 6 are field measured effect diagrams of regulation and control according to the embodiments of the present disclosure, the secondary control logic of the controlled unit and its allocation priority strategy are as follows:

For primary FM and virtual inertia regulation that require short response time, power regulation by using the wind turbine and a PV voltage source cannot meet a required regulation rate. Therefore, at the initial stage of starting primary FM and virtual inertia response, with high charging and discharging rates, the energy storage system is used to undertake the regulation of primary FM and virtual inertia. With power response of the wind turbine and the PV device, charging and discharging rates of the energy storage system are dynamically regulated to gradually transit to use the wind turbine and the PV device to undertake the main active power regulation. An energy storage unit mainly supplements the power output fluctuation caused by the instability of the wind and optical power and overshooting of the wind turbine and the inverter.

For primary voltage regulation and reactive quick response control that require short response time, power regulation by using the wind turbine and the PV voltage source cannot meet the required regulation rate. Therefore, at the initial stage of starting primary voltage regulation and reactive quick response, with high reactive charging and discharging rates, the SVG system is used to undertake the main regulation. With the power response of the wind turbine and the PV device, charging and discharging rates of the SVG system are dynamically regulated to gradually transit to use the wind turbine and the PV device to undertake the main reactive power and perform primary voltage regulation. An SVG unit mainly supplements the reactive power output fluctuation caused by the instability of the wind and optical power and overshooting of the wind turbine and the inverter, so as to stably regulate the target power.

The embodiments of the present further provide a coordinated control system for active support of a new energy power station containing a voltage-controlled source, including:

parameter setting module configured to obtain a working mode and a controlled target value of an external characteristic of a new energy power station based on operation and control instructions of dispatching and source network load storage, and set internal parameters of a voltage-controlled source and a current-controlled source in the new energy power station based on the working mode of the external characteristic of the new energy power station;

a voltage source regulation margin calculation module configured to monitor a power output state of a controlled unit of a voltage source, and calculate a regulation margin of the voltage source;

a module for obtaining controlled allocation logic of a current source configured to set power, inertia, and an objective function and a constraint of multi-source coordinated control of primary FM/voltage regulation for the new energy power station based on a total target value of the external characteristic of the new energy power station, and obtain the controlled allocation logic of the current source based on the objective function and constraint of the multi-source coordinated control; and an allocation setting module configured to set secondary control logic of each controlled unit and its allocation priority strategy based on the regulation margin of the voltage source and the controlled allocation logic of the current source.

Further, the module for obtaining the controlled allocation logic of the current source is specifically configured to set the following objective function and constraint of the multi-source coordinated control:

$$\min_{P_g, Q_g} \sum_i f_{1i}(P_{gi}) + f_{2i}(Q_{gi}) \qquad (4)$$

$$\begin{cases} s.t.\ P_i(\theta, V) + P_{gi} - P_{di} - P_e = 0,\ Q_i(\theta, V) + Q_{gi} - Q_{di} - Q_e = 0 \\ \delta_i\ \% \times P_{i,N} \times N - \delta\ \% \times P_N = 0,\ V_i\ \% \times Q_{i,N} \times N - V\ \% \times Q_N = 0 \\ (P_i, Q_i, V_i)^{min} \le (P_{gi}, Q_{gi}, V_{gi}) \le (P_i, Q_i, V_i)^{max} \\ (\delta_i^{min}\ \%, V_i^{min}\ \%, T_{Ji}^{min}) \le (\delta_i\ \%, V_i\ \%, T_{Ji}) \le (\delta_i^{max}\ \%, V_i^{max}\ \%, T_{Ji}^{max}) \end{cases} \qquad (5)$$

Formula (4) represents the objective function of the multi-source coordinated control, and formula (5) represents the constraint.

In the above formulas, min represents a minimum value, max represents a maximum value, $P_g$ represents a power output of an active unit of the current source, and $Q_g$ represents a power output of a reactive unit of the current source; $F_{1i}$ represents an economic coefficient between a cost and the active power, $F_{2i}$ represents an economic coefficient between the cost and the reactive power, and i represents a node, where i=1, 2, 3, . . . , N; $P_{gi}$ represents a power output of an active unit of each current source, and $Q_{gi}$ represents a power output of a reactive unit of each current source; $P_{di}$ represents an active load of the node, and $Q_{di}$ represents a reactive load of the node; $P_i(\theta,V)$ represents a power output of an active unit of the voltage source, $Q_i(\theta,V)$ represents a power output of a reactive unit of the voltage source, and $\theta,V$ represent a power angle and a phase respectively; $V_{gi}$ represents a voltage at an output port of a controlled source; $P_e$ represents detected output active power, and $Q_e$ represents detected output reactive power; $\delta_i\%$ represents a coefficient of primary FM, $V_i\%$ represents a coefficient of primary voltage regulation, and $T_{Ji}$ represents an inertia coefficient; and $P_{i,N}$ represents active power of an $i^{th}$ node in N nodes, $Q_{i,N}$ represents reactive power of the $i^{th}$ node in the N nodes, and $(P_i,Q_i,V_i)$ represent the active power, the reactive power, and a voltage of the $i^{th}$ node.

In the embodiments of the present disclosure, the parameter setting module, the module for obtaining the controlled allocation logic of the current source, and the allocation setting module each may be one or more processors or controllers that each have a communication interface, can realize a communication protocol, and may further include a memory, a related interface and system transmission bus, and the like if necessary. The processor or controller executes program-related code to realize a corresponding function. The voltage source regulation margin calculation module may be one or more processors or controllers that each have a communication interface, can realize a communication protocol, and may further include a memory, a display, a related interface and system transmission bus, and the like if necessary. The processor or controller executes program-related code to realize a corresponding function. In an alternative solution, the parameter setting module, the voltage source regulation margin calculation module, the module for obtaining the controlled allocation logic of the current source, and the allocation setting module may share an integrated chip or share devices such as a controller and a memory. The shared controller or chip executes program-related codes to implement a corresponding function.

By coordinating controlled units such as a voltage-source new energy unit, a current-source new energy unit, an energy storage unit, an SVG for dynamic reactive power compensation in the new energy power station, the embodiments of the present disclosure can represent the external characteristic of the new energy power station as a voltage-source/current-source new energy power station, so as to realize primary FM (with a power up-regulation capability), primary voltage regulation, inertia support, reverse reactive power absorption, voltage support with a low short circuit ratio, and other functions of the whole power station, thereby improving active support capabilities of the new energy power station.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments of the present disclosure further provide an electronic device, including a memory, a processor, and a computer program stored in the memory and executable on the processor, where the processor executes the computer program to implement the foregoing coordinated control method for active support of a new energy power station containing a voltage-controlled source.

The embodiments of the present disclosure further provide a non-transient computer-readable storage medium, where the non-transient computer-readable storage medium stores a computer program, and the computer program is executed by a processor to implement the foregoing coordinated control method for active support of a new energy power station containing a voltage-controlled source.

Finally, it should be noted that: the above embodiments are merely intended to describe the technical solutions of the present disclosure, rather than to limit thereto; although the present disclosure is described in detail with reference to the above embodiments, it is to be appreciated by a person of ordinary skill in the art that modifications or equivalent substitutions may still be made to the specific implementations of the present disclosure, and any modifications or equivalent substitutions made without departing from the spirit and scope of the present disclosure shall fall within the protection scope of the claims of the present disclosure.

The invention claimed is:

1. A coordinated control method for active support of a new energy power station containing a voltage-controlled source, comprising the following steps:
   obtaining a working mode and a controlled target value of an external characteristic of a new energy power station based on operation and control instructions of dispatching and source network load storage, and setting internal parameters of a voltage-controlled source and a current-controlled source in the new energy power station based on the working mode of the external characteristic of the new energy power station;

monitoring a power output state of a controlled unit of a voltage source, and calculating a regulation margin of the voltage source;

setting power, inertia, and an objective function and a constraint of multi-source coordinated control of primary frequency modulation (FM)/voltage regulation for the new energy power station based on a total target value of the external characteristic of the new energy power station, and obtaining controlled allocation logic of a current source based on the objective function and the constraint of the multi-source coordinated control; and setting secondary control logic of each controlled unit and its allocation priority strategy based on the regulation margin of the voltage source and the controlled allocation logic of the current sources;

wherein the setting internal parameters of a voltage-controlled source and a current-controlled source in the new energy power station based on the working mode of the external characteristic of the new energy power station specifically comprises the following steps:

1) If the new energy power station works in a voltage source mode, and the external characteristic is represented as a voltage (V)/frequency (f) control mode, disabling a phase-locked loop function of the current-controlled source, using the voltage-controlled source to generate a phase angle, and setting inertia and modulation parameters of primary FM for the voltage-controlled source, wherein a voltage dead zone is ±0.02 pu, and an FM dead zone is ±0.05 Hz; and 2) if the new energy power station works in a current source mode, and the external characteristic is represented as a constant active and reactive power control mode, disabling a primary FM function of the voltage-controlled source, setting active power to be constant, setting reactive power to be in a constant voltage mode, enabling the phase-locked loop function of the current-controlled source, and using a phase angle generated by a large power grid;

wherein the calculating a regulation margin of the voltage source specifically comprises:

calculating an active power compensative ratio according to formula (1), a reactive power compensative ratio according to formula (2), and a response time constant of virtual inertia according to formula (3):

$$\delta \% = \frac{P_0 - P'_e}{\Delta f - f_d} \times \frac{f_N}{P_N} \quad (1)$$

$$V \% = \frac{U_0 - U_e}{\Delta U - U_d} \times \frac{U_N}{Q_N} \quad (2)$$

$$T_J \approx -\frac{\Delta P \cdot f_N}{P_N} / \frac{df}{dt} \quad (3)$$

wherein $\delta\%$ represents the active power compensative ratio, $\Delta f$ represents a difference between a current frequency and a rated frequency, $P'_e$ represents a target value of output active power at frequency f, $P_0$ represents an initial value of the output active power, $P_N$ represents rated active power of the power station, and $f_d$ represents a response dead zone of primary FM;

$V\%$ represents the reactive power compensative ratio, $U_0$ represents an initial value of an output voltage, $U_e$ represents a current voltage, $\Delta U$ represents a difference between the current voltage and a rated voltage, $U_N$ represents a nominal voltage, $Q_N$ represents rated reactive power, and $U_d$ represents a dead zone of primary voltage regulation; and $T_J$ represents a response time constant of virtual inertia of a new energy generator unit, f represents a frequency of a grid connection point of the new energy generator unit, $f_N$ represents a rated frequency of the new energy generator unit, $\Delta P$ represents a change of active power of the new energy generator unit, $P_N$ represents rated active power of the new energy generator unit, and t represents time.

2. The coordinated control method for active support of a new energy power station containing a voltage-controlled source according to claim 1, wherein the power output state of the controlled unit of the voltage source specifically comprises: active power, reactive power, and voltage and power factors of a grid connection point, real-time active power, real-time reactive power, theoretically available power, and state information of a wind turbine, real-time active power, real-time reactive power, theoretically available power, and state information of a photovoltaic (PV) system, real-time active power, current capacity and state information of an energy storage system, and real-time reactive power, a port voltage, and state information of a static var generator (SVG).

3. The coordinated control method for active support of a new energy power station containing a voltage-controlled source according to claim 1, wherein the objective function and the constraint of the multi-source coordinated control are as follows:

$$\min_{P_g, Q_g} \sum_i f_{1i}(P_{gi}) + f_{2i}(Q_{gi}) \quad (4)$$

$$\begin{cases} \text{s.t. } P_i(\theta, V) + P_{gi} - P_{di} - P_e = 0, \; Q_i(\theta, V) + Q_{gi} - Q_{di} - Q_e = 0 & (5) \\ \delta_i \% \times P_{i,N} \times N - \delta \% \times P_N = 0, \; V_i \% \times Q_{i,N} \times N - V \% \times Q_N = 0 \\ (P_i, Q_i, V_i)^{min} \leq (P_{gi}, Q_{gi}, V_{gi}) \leq (P_i, Q_i, V_i)^{max} \\ (\delta_i^{min} \%, V_i^{min} \%, T_{Ji}^{min}) \leq (\delta_i \%, V_i \%, T_{Ji}) \leq (\delta_i^{max} \%, V_i^{max} \%, T_{Ji}^{max}) \end{cases}$$

wherein formula (4) represents the objective function of the multi-source coordinated control, and formula (5) represents the constraint; and min represents a minimum value, max represents a maximum value, $P_g$ represents a power output of an active unit of the current source, and $Q_g$ represents a power output of a reactive unit of the current source; $f_{1i}$ represents an economic coefficient between a cost and the active power, $f_{2i}$ represents an economic coefficient between the cost and the reactive power, and i represents a node, wherein i=1, 2, 3, . . . , N; $P_{gi}$ represents a power output of an active unit of each current source, and $Q_{gi}$ represents a power output of a reactive unit of each current source; $P_{di}$ represents an active load of the node, and $Q_{di}$ represents a reactive load of the node; $P_i(\theta,V)$ represents a power output of an active unit of the voltage source, $Q_i(\theta,V)$ represents a power output of a reactive unit of the voltage source, and $\theta, V$ represent a power angle and a phase respectively; $V_{gi}$ represents a voltage at an output port of a controlled source; $P_e$ represents detected output active power, and $Q_e$ represents detected output reactive power; $\delta_i\%$ represents a coefficient of primary FM, $V_i\%$ represents a coefficient of primary voltage regulation, and $T_{ji}$ represents an inertia coefficient; and $P_{i,N}$ represents active power of an $i^{th}$ node in N nodes, $Q_{i,N}$ represents reactive power of the $i^{th}$ node in the N nodes, and $(P_i, Q_i, V_i)$ represent the active power, the reactive power, and a voltage of the $i^{th}$ node.

4. The coordinated control method for active support of a new energy power station containing a voltage-controlled source according to claim 1, wherein the setting secondary control logic of each controlled unit and its allocation priority strategy specifically comprises:

at an initial stage of starting primary FM and virtual inertia response, using an energy storage system to undertake a regulation of primary FM and virtual inertia, and gradually transiting to use a wind turbine and a PV device to undertake an active power regulation, and use the energy storage system to supplement a power output fluctuation caused by instability of wind and optical power and overshooting of the wind turbine and an inverter; and at an initial stage of starting primary voltage regulation and reactive quick response, using an SVG system to undertake a regulation of reactive power and primary voltage, and gradually transiting to use the wind turbine and the PV device to undertake a regulation of reactive power and primary voltage, and use the SVG system to supplement a reactive power output fluctuation caused by the instability of the wind and optical power and overshooting of the wind turbine and the inverter, so as to stably regulate target power.

5. An electronic device, comprising: a memory, a processor, and a computer program stored in the memory and executable on the processor, wherein the processor executes the computer program to implement the coordinated control method for active support of a new energy power station containing a voltage-controlled source according to claim 1.

6. A non-transient computer-readable storage medium, wherein the non-transient computer-readable storage medium stores a computer program, and the computer program is executed by a processor to implement the coordinated control method for active support of a new energy power station containing a voltage-controlled source according to claim 1.

7. An electronic device, comprising: a memory, a processor, and a computer program stored in the memory and executable on the processor, wherein the processor executes the computer program to implement the coordinated control method for active support of a new energy power station containing a voltage-controlled source according to claim 2.

8. An electronic device, comprising: a memory, a processor, and a computer program stored in the memory and executable on the processor, wherein the processor executes the computer program to implement the coordinated control method for active support of a new energy power station containing a voltage-controlled source according to claim 3.

9. An electronic device, comprising: a memory, a processor, and a computer program stored in the memory and executable on the processor, wherein the processor executes the computer program to implement the coordinated control method for active support of a new energy power station containing a voltage-controlled source according to claim 4.

10. A non-transient computer-readable storage medium, wherein the non-transient computer-readable storage medium stores a computer program, and the computer program is executed by a processor to implement the coordinated control method for active support of a new energy power station containing a voltage-controlled source according to claim 2.

11. A non-transient computer-readable storage medium, wherein the non-transient computer-readable storage medium stores a computer program, and the computer program is executed by a processor to implement the coordinated control method for active support of a new energy power station containing a voltage-controlled source according to claim 3.

12. A non-transient computer-readable storage medium, wherein the non-transient computer-readable storage medium stores a computer program, and the computer program is executed by a processor to implement the coordinated control method for active support of a new energy power station containing a voltage-controlled source according to claim 4.

* * * * *